(12) United States Patent
Carper et al.

(10) Patent No.: US 6,390,374 B1
(45) Date of Patent: May 21, 2002

(54) SYSTEM AND METHOD FOR INSTALLING/DE-INSTALLING AN APPLICATION ON A SMART CARD

(76) Inventors: Todd Carper, 19672 Stevens Creek Blvd., Cupertino, CA (US) 95014; David Hemmo, 12 Rue Caillaux, 75013 Paris (FR); An Van Le, 7056 Anjou Creek Cir., San Jose, CA (US) 95120

( * ) Notice: Subject to any disclaimer, the term of this patent is extended or adjusted under 35 U.S.C. 154(b) by 0 days.

(21) Appl. No.: 09/386,288

(22) Filed: Aug. 31, 1999

Related U.S. Application Data

(60) Provisional application No. 60/116,243, filed on Jan. 15, 1999.

(51) Int. Cl.[7] .............................................. G06K 19/06
(52) U.S. Cl. ....................................... 235/492; 235/380
(58) Field of Search ................................ 235/492, 380, 235/384, 441, 375, 487, 486; 360/23, 29; 705/40–44

(56) References Cited

U.S. PATENT DOCUMENTS

| | | | | |
|---|---|---|---|---|
| 4,727,244 A | * | 2/1988 | Nakano et al. .............. | 235/380 |
| 4,882,474 A | | 11/1989 | Anderi et al. ................ | 395/182 |
| 5,070,233 A | * | 12/1991 | Takizawa et al. ........... | 238/380 |
| 5,310,999 A | * | 5/1994 | Claus et al. ................. | 235/384 |
| 5,740,349 A | | 4/1998 | Hasbun et al. .............. | 235/380 |
| 5,805,869 A | * | 9/1998 | Smith et al. ................. | 395/507 |
| 5,901,303 A | * | 5/1999 | Chew .......................... | 395/400 |

OTHER PUBLICATIONS

Rankl et al., Smart Card Handbook, John Wiley & Sons, (copyright 1997), pps, 14, 91, 103, 107–10, and 127–28.

Guthery et al., Smart Card Developer's Kit, Macmillan Technical Publishing (copyright 1998), pps, 175, 176, and 219–20.

PCT International Search Report Apr. 2000.

* cited by examiner

*Primary Examiner*—Thien M. Le

(57) ABSTRACT

A set of related routines allows an application to be securely installed on, or de-installed from a smart card or other portable token. The capabilities of a true operating system on the smart card are used to facilitate installation/de-installation.

31 Claims, 9 Drawing Sheets

SYSTEM AND METHOD FOR INSTALLING/DE-INSTALLING AN APPLICATION ON A SMART CARD

CROSS REFERENCE TO RELATED APPLICATION(S)

This application claims the benefit of U.S. Provisional Application No. 60/116,243 filed Jan. 15, 1999.

FIELD OF THE INVENTION

The present invention relates to the field of portable tokens such as smart cards. More particularly, the present invention relates to a smart card capable of dynamically installing or de-installing one or more applications. Installation/de-installation may be done in the field through a terminal, or through an un-secure source such as the Internet.

BACKGROUND OF THE INVENTION

Most consumers are familiar with credit cards, debit cards, and automatic teller machine (ATM) cards. Such cards are increasingly used to access, transfer and spend money. The back of these cards includes a magnetic strip storing encoded information about the cardholder and the account(s) accessible by the card. Terminals, including ATMs and merchant point-of-sale terminals, read the encoded information from the card and access the cardholder's account to complete a transaction.

Besides the well-known credit and debit cards, stored value cards are becoming increasingly popular. Stored value cards are purchased or issued with a specific monetary value. When the cardholder desires to use the stored value card to purchase goods or services, the card is presented at the point of sale and the cost of the goods or services is deducted from the value of the card. The cardholder may continue to use the stored value card in this manner until all the value has been removed from the card. The card may then be discarded, or its value may be replenished. Such cards are commonly used to pay subway fares or to make long distance phone calls.

For many types of transactions, however, the current trend is away from credit/debit cards and stored value cards, and into a class of devices generally called smart cards. Rather than employing information encoded on a magnetic strip, smart cards include a microprocessor and a memory element embedded within a credit card size device. With a microprocessor, a smart card is able to interact with a greater variety of terminals across a broader range of transactions. In this broader range of transactions, the smart card is able to communicate more information regarding the cardholder, cardholder account, transaction authorization, etc.

The term "smart card" is used throughout as a convenient name for a broad class of devices sometimes referred to as portable tokens. Smart cards are the most common present form of portable tokens, but as will be seen hereafter the actual physical form of the portable token, as well as the specific means by which the portable token communicates data to the outside world are not the subject of the present invention.

Smart cards have been used in various applications for some time. FIG. 1 shows an exemplary smart card 10. Roughly the size of a credit card, smart card 10 includes a microprocessor 12 with an integral memory element, and conductive contacts 13. Microprocessor 12 is typically a single wafer integrated circuit mounted on, or embedded within the otherwise plastic smart card. Conductive contacts 13 interface with a terminal to electrically transfer data between the terminal and the smart card. Other embodiments of the smart card do not include conductive contacts 13. Such "contactless" smart cards receive information via proximately coupling, such as magnetic coupling, or via remote coupling, such as radio communication.

The microprocessor 12 and conductive contacts 13 of FIG. 1, are shown in some additional detail in FIG. 2. Conductive contacts variously include power contacts, at least one input/output (I/O) port, a reset port, and a clock (clk) signal port. Microprocessor 12 comprises a central processing unit (CPU) 21 which is generically control logic including I/O circuitry 23. Terminal signals variously interface with CPU 21 through the conductive contacts 13 and I/O circuitry 23. Microprocessor 12 is associated with a memory element 20. The "memory" may be formed on the same integrated circuit as the microprocessor, or may be formed on a separate device. Generally, the memory includes Random Access Memory (RAM) 22, Read Only Memory (ROM) 24, and read/write memory, such as an Electrically Erasable Programable Read Only Memory (EEPROM) 26. However, some or all of these presently-used memory elements may be replaced by battery backed-up RAM, flash memory, or other electronic data storage media.

Operating power, a user input keypad, and a display for the smart card microprocessor are typically provided by a terminal. The term "terminal" broadly indicates any device exchanging information with a smart card using any type or number of data transfer means. A computer, ATM, merchant point-of-sale device, telephone, or security control device, are present examples of terminals.

A broad class of terminals nominally include a mechanism detecting the presence of a properly positioned smart card. Upon detecting the smart card, the terminal provides power to the microprocessor, and typically sends a reset (RST) signal to the smart card. The smart card uses the RST signal to reset itself, or to initiate an internal reset function. After reset, the smart card returns an answer-to-reset (ATR) signal to the terminal. The nature and protocol for the ATR signal is established by International Standards Organization (ISO) standard 7816. As established, the ATR is a multi-byte signal communicating basic information concerning the smart card to the terminal. Once such basic information is successfully recognized by the terminal, communication, i.e., data transfer, between the smart card and the terminal can be established.

Smart cards can be programmed to operate as stored value cards, credit cards, debit cards, ATM cards, calling cards, personal identity cards, critical record storage devices, etc. In these varied capacities, a smart card may, at least in theory, be designed to use a number of different application programs. In actual practice, however, an inability to readily develop and operate applications from a variety of sources has limited the type and number of applications placed on the conventional smart card. In fact, most conventional smart cards include only a single application, or at most a single type of application.

This is not surprising when one considers that from programming and implementation perspectives, a conventional first generation smart cards is little more than an embedded application. Looking at FIG. 3A, such first generation cards can be viewed as an application 30 stored in memory which runs a set of microprocessor-specific instructions on hardware resources 32. The term "hardware resources" is used to generically indicate the memory and logic circuits, with their associated interfaces, used to execute microprocessor instructions but may also include I/O circuits, power circuits, and the other hardware. Given the structure shown in FIG. 3A, each application must be written in a very low level, or machine level language. This language is specific to the microprocessor on which the application is intended to run.

The first generation, embedded application programming model offers at least one significant advantage—programming flexibility. Microprocessors are typically able to execute a significant set of instructions. Since an embedded application is written at the machine level, the full range of the microprocessor's instructions set may be accessed and utilized by the application.

Unfortunately, such programming flexibility comes at a high price. In order to run an existing application on a different microprocessor, it must often be completely rewritten. Debugging, updating, and testing of embedded applications are arduous. Further, machine level programming is difficult and requires a great deal of hardware specific expertise. Embedded programmers are, thus, hard to find and expensive to retain. All of these factors combine to restrict the number and quality of smart card applications. Further, the hardware specific nature of the resulting applications contributes to the incompatibility problems which characterize conventional smart card applications.

Such conventional smart cards do not employ a true operating system. Rather, a specific application written according to the microprocessor instruction set is stored in ROM and executed in accordance with commands received from a terminal. MPCOS, VisaCash, GSM, and Proton are examples of such first generation embedded applications.

Because conventional first generation smart cards store their embedded application in ROM, there is no real opportunity to significantly change or modify the application once smart cards are fielded. This presents a real problem to smart card issuers, since operating/programming errors and oversights, collectively and generically called "bugs," are continually identified following release of any smart card application. Historically, severe bugs may only be remedied by physically replacing smart cards in the field with cards having an improved version of the application. Card issuers and users generally learn to live with less severe bugs.

Attempts have been made to avoid these unpleasant alternatives by utilizing the EEPROM portion of smart card memory. U.S. Pat. No. 5,542,081 allows "filter instructions" to be placed in the ROM based application which index an address in EEPROM. The EEPROM address thus allows subsequent programming steps to be grafted into the existing application stored in ROM. This additional filtering approach does create a mechanism of sorts for mitigating the effects of application bugs, but it doe not actually correct the errant application code generating the bug.

For example, assume an application as written in ROM creates a data object D by performing steps A and then C. In effect, A+C=D. After issuing smart cards with this application, the issuer identifies an error in the application in relation to the creation of data object D. The remedy for this error requires that D be created by steps A, then B, and then C, i.e., A+B+C=D. The conventional filtering approach would first create an "incorrect" D according to the ROM based application steps, and thereafter delete the incorrect data object D, and then re-create it using the EEPROM based application steps identified in the filtering instructions.

One can readily see that the filtering approach is very inefficient, and for more than one or two minor fixes results in a tangled mess of code. Not surprisingly, while this inefficient filtering approach to correcting a ROM based application works well enough for smart cards running a single application, it would not work for a smart card running multiple applications from different vendors.

The historic inability to securely modify or upgrade existing smart card applications in the field is just one reason why smart cards have failed to realize their full commercial potential. Many other reasons exist. Prominent among theses reasons is the absence of a true operating system (OS) supporting applications from multiple vendors.

A true operating system does not execute commands received from the outside world. Thus, in the context of a smart card, a true operating system will not (is unable to) execute commands received from a terminal. Rather, an operating system serves as a conduit and router for commands communicated from a terminal to an application stored on the smart card. Additionally, an operating system serves as a conduit through which an application utilizes the hardware resources. In other words, an operating system provides I/O functions and provides other functionality to applications running on the OS. Since first generation smart cards store only the application code, and since this code must necessarily executes commands received from the terminal, first generation smart cards do not include an operating system.

In an attempt to overcome the difficulties, limitations and expense associated with the programing of first generation smart cards, second generation smart cards incorporate an interpreter. An interpreter can be thought of as a library of commands. JAVA and BASIC are common interpreters. A set of commands is defined and identified in the interpreter, any one of which may be "called" by an application. The term "call" or "calling" is used throughout to broadly describe a relationship between two pieces of code in which one piece invokes the other. Commands, functions, definitions and instructions may be used by having one piece of code call another pieces of code. The foregoing pieces of code may reside within the an application or the OS.

Conceptually, an interpreter 33 can be thought of residing between application 30 and hardware resources 32, as shown in FIG. 3B. Thus, an application running on a second generation smart card gains access to the hardware resources only through the interpreter which converts a command into one or more microprocessor instructions.

The interpreter effectively provides a higher level of abstraction and a programming language reflecting this level of abstraction with which a broader class of programmers may effectively write applications. However, the definition of commands by the interpreter, which promotes programming efficiency and standardization, necessarily restricts programing flexibility, since an interpreter will never define the entire range of commands theoretically made possible by an unrestricted combination of the microprocessor instructions. Thus, by use of an interpreter, programming flexibility is traded away for programming ease and standardization. The use of an interpreter also slows program execution since commands must be converted into microprocessor instructions before execution.

Further, since conventional smart cards implement the file structure defined by ISO-7816, part 4, the use of an interpreter comes as an additional penalty to programming flexibility. That is, ISO-7816, part 4 already confines an application programmer to a certain command set used to define a standard file architecture. On top of this restriction, the interpreter further confines the programmer to another fixed set of commands. If a particular functionality is not defined by a command in the interpreter's library, the functionality can not be implemented within an application.

For example, if some new smart card application desired the function of outputting data to a printer, this function could not be implemented if the interpreter lacked the necessary command, such as a "PRINT" command commonly associated with desktop computers. Such functional inabilities attributable to the interpreter are particularly exasperating where a sequence of microprocessor instructions might be designed to implement the desired "new" function, but where the programmer lacks access to the microprocessor instruction set because of the obligatory presence of the interpreter.

Like the embedded application of first generation smart cards, both the application and the interpreter of second generation smart cards are stored in ROM. The process of correcting bugs is thus complicated by the possibility of fixing code in one or both of the interpreter and the application.

Even where modification or upgrading to a fielded smart card application can be accommodated in the conventional smart card, the physical process of reprogramming must be performed in a "trusted" device. That is, a terminal controlled by the smart card issuer must used to reprogram the smart card application in order to ensure code integrity. This is true because conventional smart cards, in and of themselves, do not have the processing capability or sophistication to verify new programming code.

Rather, conventional smart cards merely store security keys which are exported to the trusted machine during the security routine used to authenticate the new code. Thus, the trusted machine, not the smart card, performs the security routine. Such a process requires that the smart card export proprietary security keys. Once exported, the smart card loses control over the keys, thereby creating a number of additional opportunities for hackers to breach the card's security.

SUMMARY OF THE INVENTION

The present invention provides a system and method by which one or more applications may be securely installed on a smart card. Additionally, the present invention provides a system and method by which one or more applications may be securely de-installed from a smart card. The capabilities of a true operating system running on the smart card are used to facilitate the install and de-install operations.

In one aspect, the present invention allows a clear definition to be drawn between manufacture of the smart card and it's programming. Thus, a method of manufacturing a smart card is provided, where the smart card comprises a microprocessor and a memory, the memory comprising ROM and read/write memory. The method comprises storing at least a portion of an operating system (OS) in ROM, storing at least a boot application in ROM, and following complete manufacture of the smart card, providing the smart card to an issuer without material data stored in read/write memory. The material data comprises either a file structure or a security key.

In another aspect, the present invention provides a method of initializing a smart card. Assuming the smart card comprises a microprocessor and a memory and the memory comprises a ROM and read/write memory, the ROM storing an operating system (OS) and an application, the method comprises; powering the smart card via a terminal, determining whether the smart card has ever previously been powered, and upon determining that the smart card has never previously been powered, performing an first-power initialization routine.

The first-power initialization routine comprises initializing the read/write memory, locating the application in ROM, and installing the application in read/write memory. The application may comprise a boot application allowing insertion of a new data object into read/write memory, and a call to a download manager in the OS. Following installation of the application in read/write memory, an initialization routine may be performed which comprises building a memory management record, and sending an Answer-To-Reset (ATR) signal to the terminal. The initialization routine might further comprise; determining whether a transaction record is present in memory, and upon determining that a transaction record is present in memory calling a transaction manager, and by operation of the transaction manager, clearing the transaction record.

Given the potential length of the first-power initialization routine and the initialization routine, before performing either the smart card may send a first portion of the ATR signal to the terminal, and wherein the step of sending the ATR signal to the terminal following the step of building the memory management record comprises sending a second portion of the ATR signal to the terminal.

In another aspect of the present invention, the ROM-based boot application is installed upon first-power initialization and used to download a new application data object which is ultimately converted to a new application. To accomplish this, the boot application will return a command table when installed, the commands in the table allowing for the download of the new application data object and calling of a download manager. When called the download manager will in turn call the new application data object. The new application data object will create a command table for the new application which is stored in read/write memory. Before calling the download manager, the boot application may perform a security verification routine on the new application data object.

In yet another aspect, the present invention provides a method of downloading a second application from a terminal into a smart card memory, the memory storing an operating system (OS) and a first application, the method comprising; calling the first application from the terminal, by operation of the first application, inserting a new application data object in memory, and converting the new application data object into the second application. Before converting the new application data object into the second application, the first application may verify the authenticity of the new application data object using a digital signature, for example.

Within this method, the step of converting the new application data object into the second application comprises; calling a download manager in the OS, calling the second application from the download manager, and generating a command table for the second application.

Command tables and other persistent data records within the context of the present invention may be stored and accessed in a file directory using an efficient data record structure using OS based file manager.

In still another aspect, the present invention provides a method of de-installing an application on a smart card, the smart card comprising a microprocessor and a memory, the memory storing an operating system (OS) and the application, the method comprising; deleting all data objects associated with the application, and deleting all data records associated with the application.

In a related aspect, step of deleting all data objects associated with the application, and deleting all data records associated with the application comprises; beginning with a $1^{st}$ data object associated with the application and continuing through the $N^{th}$ data object associated with the application, for each data object, deleting the data object by operation of the application, and calling the file manager, and by operation of the file manager, deleting the data record associated with the data object. Following deletion of the $N^{th}$ data object and the $N^{th}$ data record associated with the application, the method may thereafter delete the application data record from memory, and by operation of the memory manager reallocate memory space associated with the application as being available.

DETAILED DESCRIPTION

Some limitations inherent in conventional smart cards are manifest during the manufacturing process. As presently required, conventional smart cards pass from the smart card manufacturer to the smart card issuer with data necessarily stored in nonvolatile, read/write memory, as well as in ROM. In the explanation which follows, some arbitrary lines have been drawn between stages in an exemplary process by which smart cards are placed into commercial use. Such descriptive lines are intended merely to facilitate the explanation which follows. To begin, a "manufacturer" creates the physical smart card structure. There are relatively few smart card manufacturers in the world, and many present and potential smart card issuers.

Figure 1:
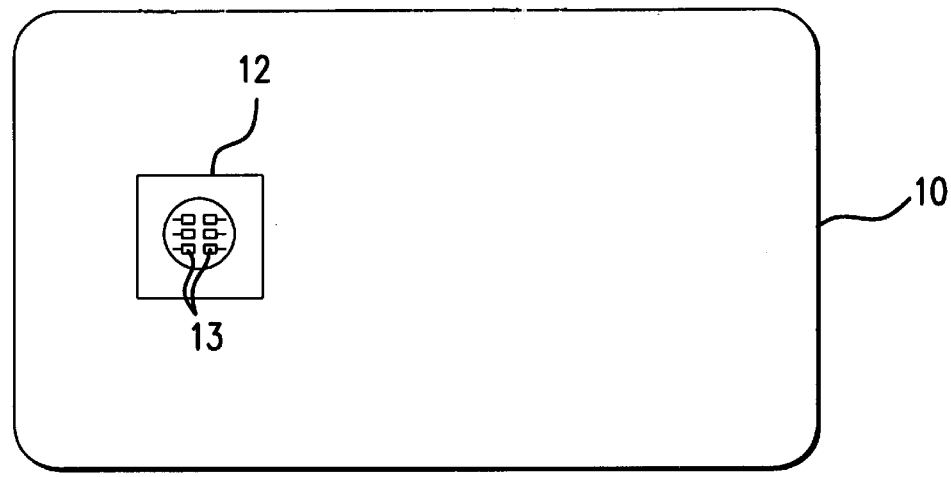
FIG. 1 shows an exemplary smart card.
Figure 2:
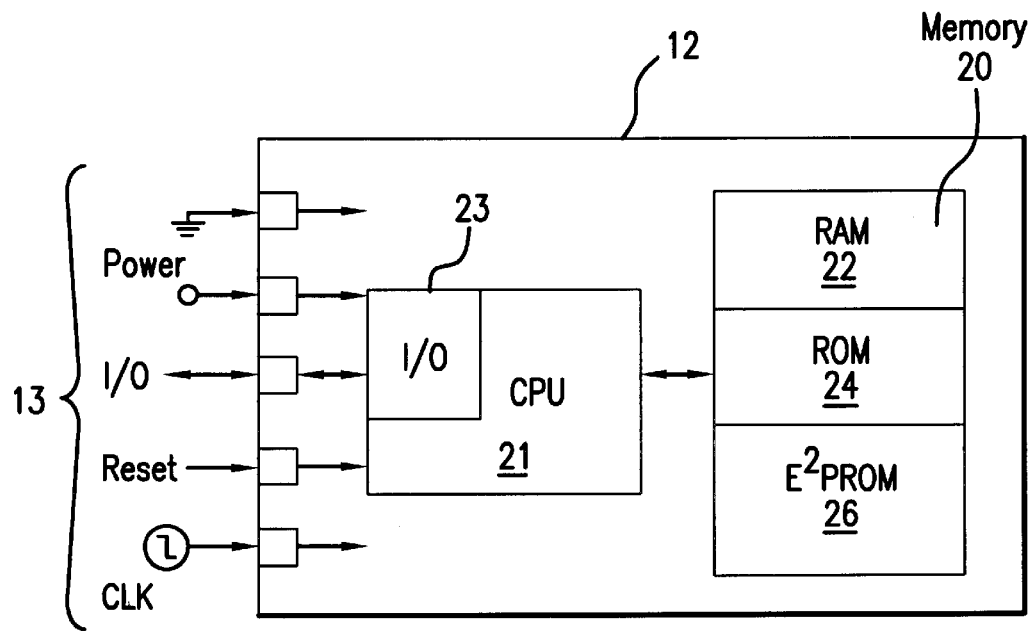
FIG. 2 shows the integrated circuit portion of the exemplary smart card of FIG. 1 in some additional detail.
Figure 3A:
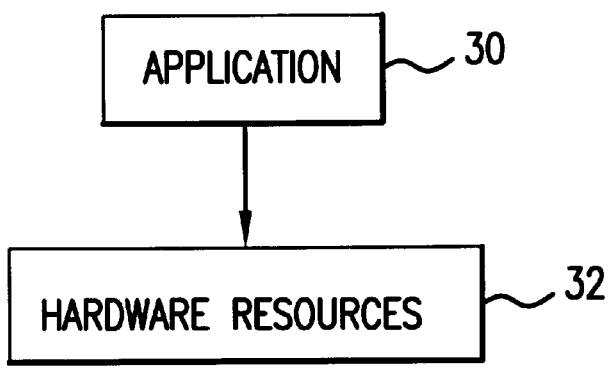
FIG. 3A illustrates the software/hardware relationship of a conventional, first generation smart card.
Figure 3B:
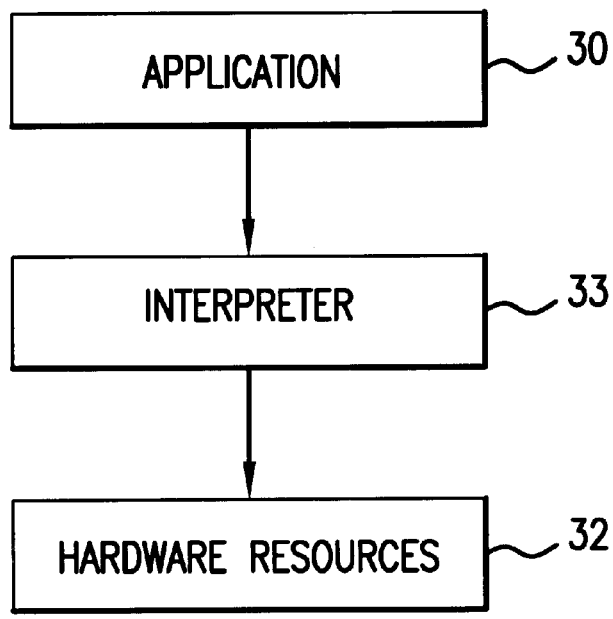
FIG. 3B illustrates the software/hardware relationship of a conventional, second generation smart card.

As introduced in the foregoing section example, the term "smart card" was described with reference to the common commercial device shown in FIG. 1. While this example serves well for the explanations which follow, it should be noted that the present invention is broadly applicable to class of devices having physical form factors which are different from the one illustrated in the example. For example, the present invention is readily adapted to Secure Interface Modules (SIMs) and Secure Access Modules (SAMs). SIMs and SAMs are physically "cut-down" versions of the classic smart card, and are used with telephones and other spaces smaller than that typically provided by larger terminals. Obviously, the size, shape, nature, and composition of the material encapsulating or mounting the microprocessor and memory element are not relevant or limiting to the present invention. Thus, as used in the description that follows and as claimed below, the term "smart card" should be broadly read as encompassing any self-contained combination of microprocessor and memory element capable of performing a transaction with another device, generally referred to as a terminal.

The term "issuer" denotes the party responsible for at least one application on the smart card. That is, the issuer is the party ultimately responsible for the development, implementation, security, and/or utility of an application running on the smart card. The manufacturer and the issuer may be the same party, but are more likely than not different commercial entities. An issuer may sell or distribute smart cards directly or through various middlemen until they reach the ultimate customer, the "user."

The fact that a manufacturer will produce smart cards for more than one issuer presents some real concerns, given the conventional approach to smart card development. Efficiency requires that the manufacturer generate or mask certain code into ROM. Unfortunately, the manufacturer is also typically required to place certain data in read/write memory. Such data includes, for example, initial file structure information and specialized transport keys which are necessary to preclude fraudulent use of blank smart cards.

This requirement that the manufacturer place certain data in read/write memory inherently threatens an issuer's ability to control access to, and definition of the application. By handing a manufacturer proprietary keys, an issuer creates an entire range of potential security problems. Since many manufacturers are also issuers, or produce smart cards for other issuers, the potential for conflicts of interest is very real.

The present invention avoids these problems by providing a smart card which may be delivered from the manufacturer to an issuer without any data stored in read/write memory. The issuer may thus completely define an application without sharing proprietary information with the manufacturer.

In one aspect, the present invention accomplishes this result by providing a smart card having a true operating system (OS), as defined above. For purposes of explanation, the OS is said to implement or define a number of functions. As used in this capacity, the term "function(s)" should not be read as denoting only classic functionally programming operations, such as "MOVE," "STORE," "LOOP," etc., but should be read as including any operation or data state definable within the OS. Typically, an OS function is defined by a collection or sequence of instructions. However, an OS function might consist of only a single microprocessor instruction, or an OS function might be nothing more than a particular variable definition. Thus, the term function(s), as used throughout, should be construed as something having relation to or a definition within the OS.

In one aspect of the present invention, the OS is used in conjunction with an

Application Programing Interface (API) and/or a Hardware Application Layer (HAL). These features are described in a commonly assigned U.S. patent application Ser. No. 09/386,290 filed Aug. 31, 1999. The subject matter of this application is incorporated herein by reference.

When present, the API further defines, or indexes, the OS functions, or more preferably a subset of the OS functions.

In effect, the API forms a library of favorite, or most commonly used functions callable by applications on the smart card. In the common vernacular of programmers, the API is "glue" between the applications and OS. Thus, as a command is executed by an application, one or more OS functions may be called through the API. Conceptually, the API may be thought of as a vector table in which OS functions are immediately cross-referenced with an address in memory to the code implementing the function. Any application written for the smart card may make use of the API, but unlike the conventional smart card employing an interpreter, the application is not required to operate within the set of functions indexed within the API. The API, thus, provides an efficiency resource defining certain standard functions, without constraining an application to the use of only the standard functions.

An API allows shared data objects to be defined which may be referenced by any application running on the smart card. The API index of functions provides a reference for programmers during development of an application. As such, standardization and consistency of use are obtained. Further, the API provides an additional level of programming abstraction above the OS. By consistent recourse to the API, applications programmers may literally ignore the specific nature of the hardware resources accessed through the OS, and may also ignore much of the OS. This level of abstraction allows applications to be written in terms of a standard API which are able to run on literally any microprocessor.

The term "command" is used throughout to denote a data or control transaction between a terminal and a smart card application, or between one application and another. As described above, because a smart card according to the present invention uses a true OS, the OS can not execute a command. Rather, the OS facilitates transmission of the command from a terminal (or another application) to the application. When executed in the application, the command may result in one or more calls to the OS for certain functions. One or more of these calls may be made through the API, or may be made directly to the OS for functions which are not indexed within the API.

However, such function calls from the application to the OS, whether through the API or not, are optional—not mandatory. Within one aspect of the present invention, a smart card application may be stored in native form. That is, the application may, in whole or in part, be complied down to machine executable object code capable of running directly on the hardware resources of the smart card without any call to the OS.

The advantages of this option are profound. For example, assume in year one that a competent OS defining an adequate plurality of functions is commercially implemented on large number of smart cards. Further, assume a very popular application "X" runs on smart cards using this OS.

Next, assume in year two that a bright smart card applications programmer determines to implement an entirely new function within application X. The new function may be readily implemented using the existing microprocessor instruction set, albeit in a previously unheard of sequence, but has not been defined within the OS.

In this situation, the conventional first generation smart card would require a significant rewrite of the application. Further, since the first generation smart cards run on a fixed, embedded version of application X, all existing smart cards must be replaced with new cards in order to implement an upgraded version of the application X including the new function.

Conventional second generation smart cards can not implement the new function because the existing interpreter does not define it. Thus, in order to upgrade application X in second generation smart cards, a new version of the interpreter must be written and downloaded onto each card. Since second generation smart cards store the interpreter in ROM, and generally lack a mechanism to perform field downloads, particularly in relation to an interpreter, such cards must be physically replaced in the field in order to provide customers with the upgraded version of application X.

In the context of a smart card system in which code may be quickly and easily downloaded in the field, the option of having an upgraded application X bypass the OS to directly execute the new function in the microprocessor is particularly profound. For example, the party owning and/or administering application X may not be the same party owning the OS, and/or the smart card. Thus, the owner of application X may lack the ability or authorization to amend the OS. Similarly, the new function may be highly proprietary and as such the owner of application X may not wish to disclose the function to the OS or smart card provider.

In any event, application X may be upgraded in the field to incorporate code, which when directly executed on the microprocessor, provides the new function without call to the OS. Such limited amendment of application X leaves all other applications and the OS untouched. That is, the OS need not be modified to implement the new function. As a result, the relationship between the OS and all other applications stored on the smart card is not altered.

Alternatively, the OS might be upgraded to define the new function, and thereafter the API might be amended to index the new function. The process by which, in another aspect, the present invention amends, or replaces ROM-based programs such as the OS, API, and HAL or ROM based applications is referred to as "patching." Patching is described in a commonly assigned U.S. Pat. No. 6,338,435. The subject matter of this application is incorporated herein by reference.

In one embodiment of the present invention, the OS and one or more applications are stored in ROM. Additional applications may be stored in read/write memory, but at least the initial bulk of the programs will be stored in ROM. This embodiment is presently preferred on a cost basis, but it is recognized that as the performance characteristics and relative cost of various memory types, i.e., as between ROM, EEPROM, and their substitutes like Flash, change over time this preference may change.

Because the present invention provides a smart card having a true OS, the smart card memory must store at least a "boot" application. That is, because a true OS is unable to execute any command received from a terminal, some application must be resident on the smart card to receive an execute at least one beginning command. Assuming a conventional relationship in which a manufacturer is asked to mask an application(s) into ROM, and define read/write memory in relation to the application(s), a smart card according to the present invention operates normally, as explained below. However, the present invention provides much more.

Assume as one example that an issuer purchases a "minimal" smart card from a manufacturer. A minimal smart card, which when physically produced and delivered to the issuer for programming, includes the typical hardware resources, i.e., a microprocessor and a memory. The memory will store the OS and the boot application in ROM. Read/write memory, typically an EEPROM, will be empty.

At this point, it is further assumed that the OS defines a plurality of functions including a "download manager." The download manager is a piece of code which is capable of taking a data object stored in memory and converting it into a working application on the smart card. The data object thus converted is called an "application data object" to distinguish it from other types of data objects stored in memory.

The download manager often cooperates with a file manager and a memory manager. These two managers, as presently preferred, are described in a commonly assigned U.S. patent application Ser. No. 09/386,286 filed Aug. 31, 1999. The subject matter of this application is incorporated herein by reference.

The boot application stored in ROM must be capable of executing at least two commands, or their equivalent: (1) inserting a data object in read/write memory, and (2) calling the download manager. This statement is particularly true for the current example of a minimal smart card delivered to the issuer without anything loaded in read/write memory. In other words, the boot application accomplishes at least one task—downloading a second application. This second application may have any form, and may even be a new or more sophisticated boot application. Before performing this task, however, the boot application must, like all other applications running on a smart card according to the present invention, must be "installed."

Before explaining the install routine, an exemplary start-up routine will be described. This start-up routine, which may include many other features and functions not described here, will be explained with reference to the flowchart shown in FIG. 4.

When power is received in the smart card, it determines whether or not power has ever been previously applied to the smart card (40). This determination may be made, for example, by examining a predetermined memory location in read/write memory. If the smart card determines that this is the first time power has been applied (40=yes), it enters a "first-power initialization routine." As described below, a smart card according to the present invention will preferably run an "initialization routine" upon each power up. The first-power initialization routine is a specialized version of the initialization routine which is run one time following manufacture of the smart card. The first-power initialization routine may be run at the manufacturer's facility, at the issuer's facility, or at a terminal in the field when the smart card is first used. Both the first-power initialization routine and the initialization routine are preferably part of the OS, but may be included as part of one or more smart card applications.

Figure 4:
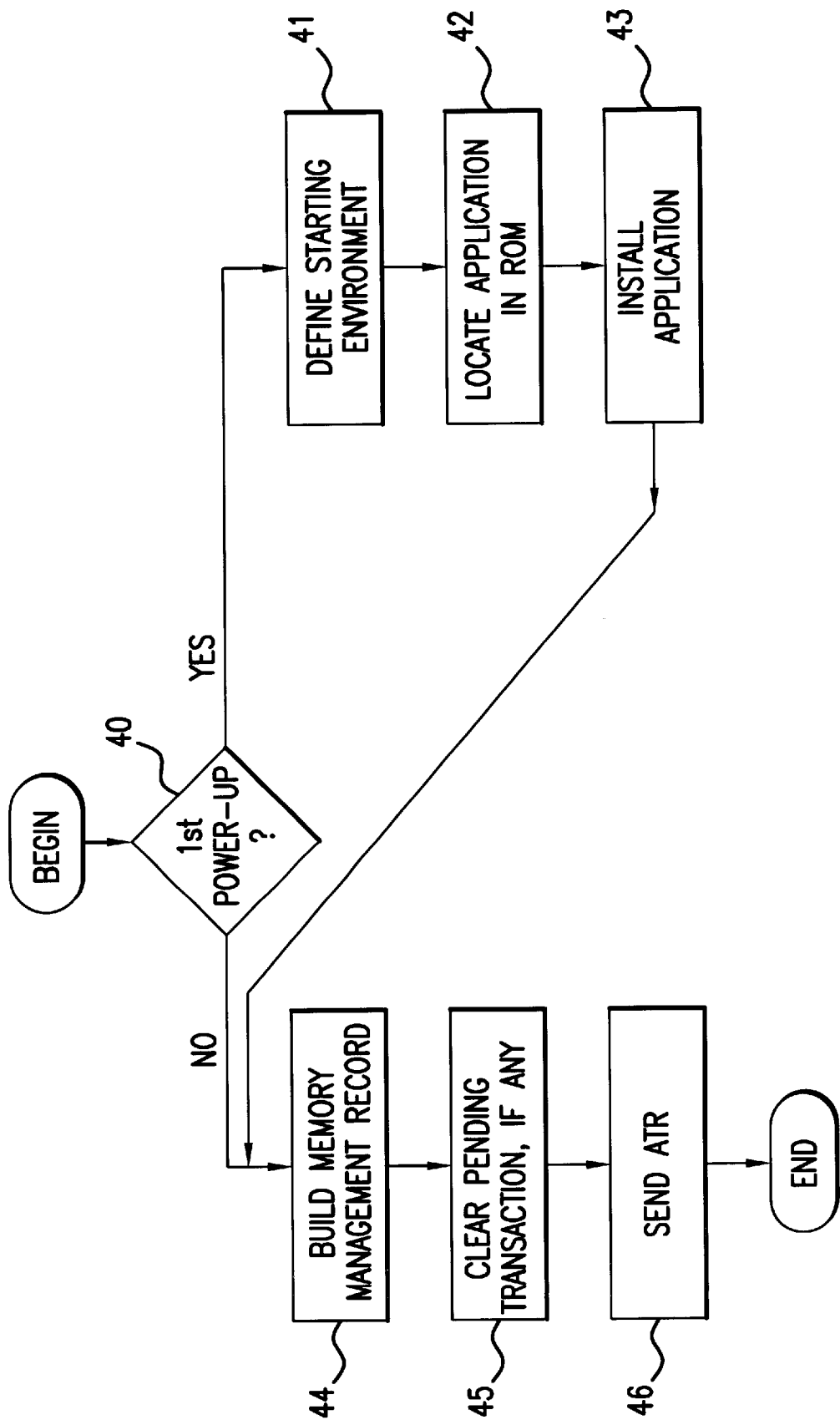
FIG. 4 is a flowchart illustrating a portion of an exemplary start-up routine including a first initialization routine and an initialization routine.

With reference to FIG. 4, the first-power initialization routine comprises; defining the smart card starting environment (41), locating an application in memory (42), and installing the application (43). The definition of the smart card starting environment will very from card to card, but as presently preferred will at least establish a portion of read/write memory for storing global data objects, define a file directory in read/write memory, and initialize other variable, data, and file structures in memory. In effect, defining the smart card starting environment creates a place for subsequently installed application to live.

Once the starting environment has been defined, the boot application stored in ROM is located (42), and installed (43). This is the case in the present example which assumes that the only application stored in ROM is the boot application. However, the present invention is also applicable to smart cards storing multiple applications in memory (i.e., ROM and/or read/write memory). Any application stored in memory might be installed during the first power initialization routine, but as explained above, an ability within the smart card to download additional applications requires that the application, whatever it other characteristics and wherever it is stored, be able to execute commands inserting a data object and calling the download manager.

With an application installed in read/write memory, the smart card ends the first power initialization routine and begins the initialization routine. Alternatively, as shown in FIG. 4, the initialization routine is begun upon a determination that the smart card has previously been powered (40=no).

The initialization routine may vary from card to card and from issuer to issuer, but as presently preferred the initialization routine comprises at least; building a memory management record (44), clearing a pending transaction, if any, (45), and sending ATR to the terminal indicating that the smart card is ready to begin a transaction (46). A preferred routine by which the memory management record is built is described in the. commonly assigned application referenced and incorporated above, U.S. patent application Ser. No. 09/386,286 filed Aug. 31, 1999. A preferred routine by which a pending transaction is described in commonly assigned U.S. patent application Ser. No. 09/386,287.

Figure 5:
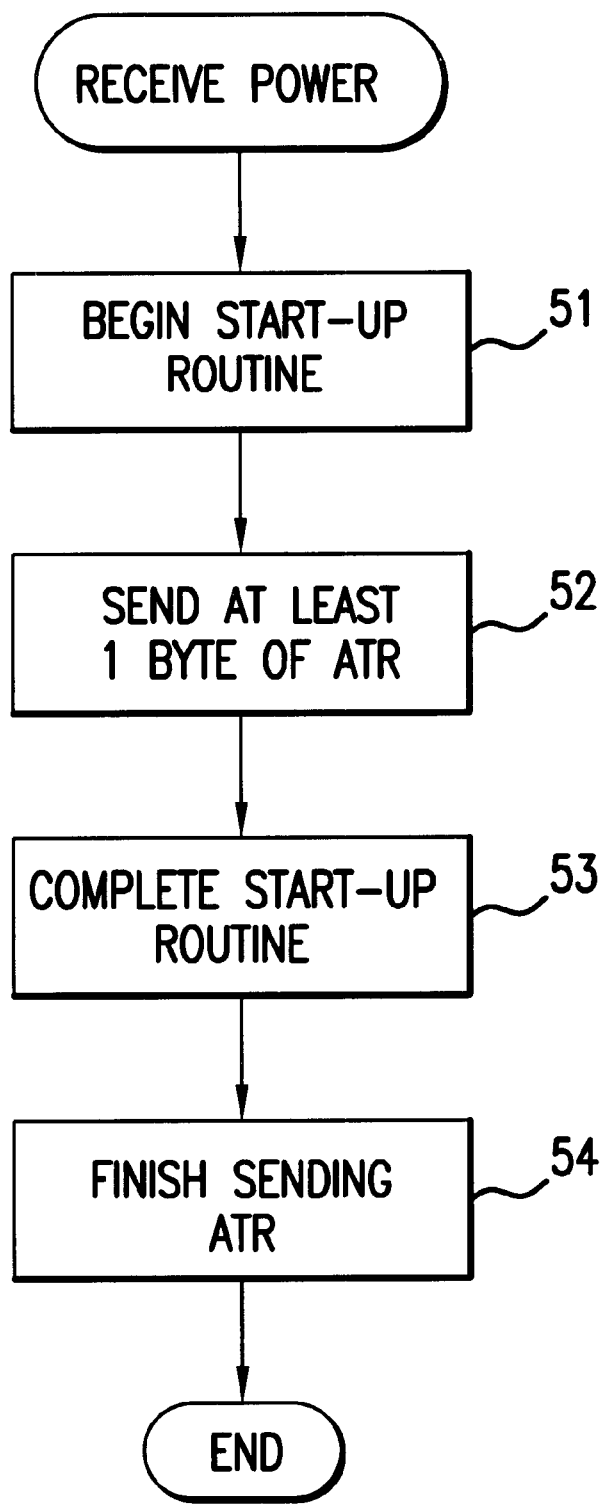
FIG. 5 is a flowchart illustrating a portion of an exemplary start-up routine including an ATR return.

Another aspect of the present invention is described with reference to the flowchart in FIG. 5. As mentioned above, ISO-7816 defines the ATR signal used by conventional smart cards to initiate communication with a terminal. Given the relatively simple nature of conventional smart card operation, the existing ATR protocol does not necessarily contemplate a lengthy start-up routine including some or all of the foregoing. It is possible, therefore, for the terminal to prematurely terminate a session when an ATR signal is not received within an anticipated period of time.

The conventional ATR signal comprises multiple bytes of data. The present invention uses this fact, to avoid "timing-out" during the Reset signal/ATR exchange routine between a terminal and a smart card. For example, looking a FIG. 5, upon receiving power and a reset signal, the smart card begins a start-up routine (51). Soon after beginning the start-up routine, the smart card returns one or more bytes of the ATR signal (52) to essentially hold the terminal while completing the start-up routine (53). Once the start-up routine is complete, the smart card sends the remaining portion of the ATR signal (54) before entering an I/O loop, or performing some other function.

As described above, the smart card must install an application as part of the first-power initialization routine. In fact, once the starting environment of the smart card has been established, additional applications may also be installed at any time. Installed applications may have many forms, and may perform many tasks. For example, an installed application might be completely new to the smart card, or it might be an upgrade to an existing application. A new application might be persistent in the smart card until de-installed, or might be a one-use application which runs once and de-installs itself immediately thereafter. Where an existing application is stored entirely in read/write memory the upgrade process simply downloads and installs the upgrade application, and deletes the existing application. Alternatively, the upgrade application might overwrite all or some of the existing application in read/write memory.

As noted above, where an application is written in ROM, wholly or in part, the process of upgrading, replacing, or amended such ROM-based applications is referred to as patching. Thus, as used herein, the concept of a "patch" has meaning with regard to ROM-based code. Applications, the OS, and API are ready examples of typical ROM-based programs which may be patched. Patches are typically one-use applications which create read/write memory-based code. Once established patch code is viewed as just another type of application which, in turn, may be upgraded or replaced by a "new application."

As one of ordinary skill in the art will recognize from the foregoing, the term "application" as used herein it not limited to just self-contained programs, but encompasses pieces of code which form part of a present, future, or existing application, whether such application is stored in ROM or in read/write memory.

Figure 6:
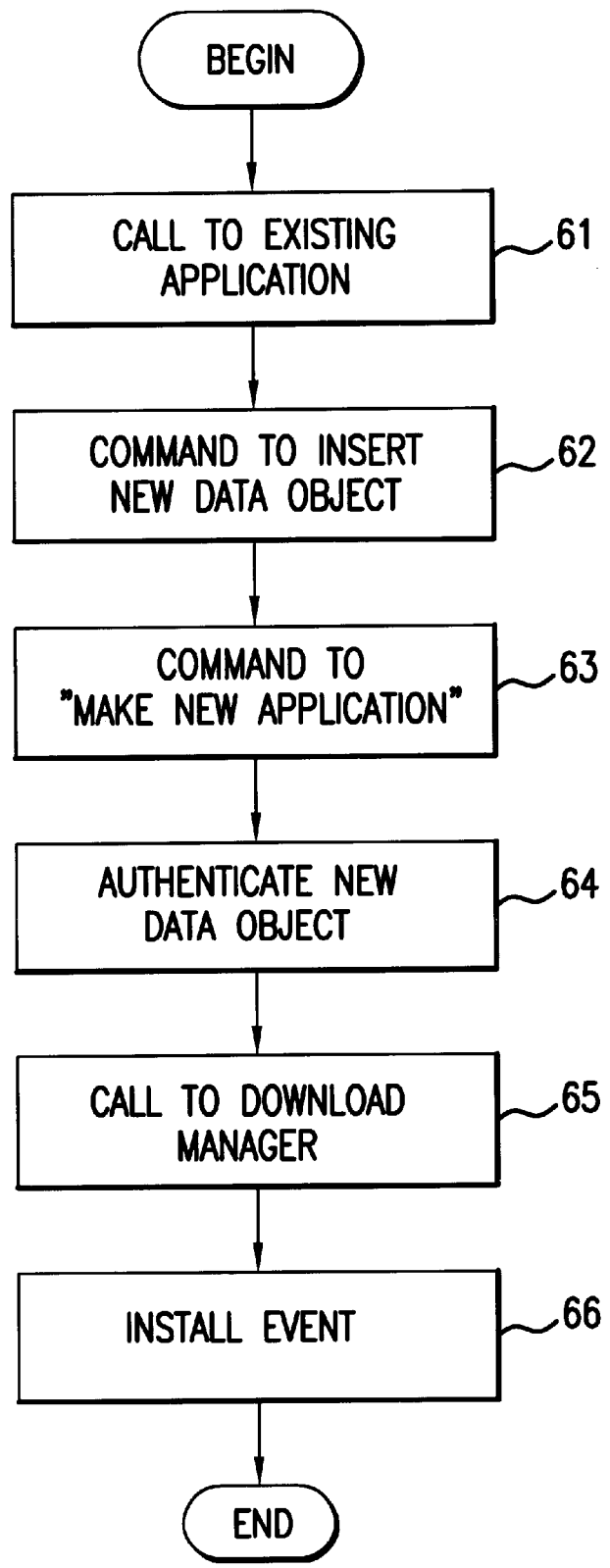
FIG. 6 is a flowchart illustrating an exemplary routine by which a new application is downloaded.

Thus, regardless of the nature of the downloaded application or its purpose within the smart card, it may be installed according to the present invention. One presently preferred method for installing an a "new" application is described in relation to the flowchart of FIG. 6. To begin, an existing application is called (61). The term "existing application" is used to denote any responsive piece of code on the smart card. An existing application may be stored in ROM or in read/write memory. It may be a boot application or any other type of application. The existing application then receives a command to insert a "new data object" (62). Once the new data object is stored in read/write memory, the existing application receives a command to make a "new application" (63). The process of making a new application from the new data object may include an authentication routine (64). Once the new data object has been authenticated, the existing application calls the download manager (65). The download manager operates on the new data object to create the new application. This routine is referred to as an "install event" (66), and will be described in more detail below.

Of note, the "call" to the existing application, and/or the commands to download the new data object and make the new application may come from a terminal, another application running on the smart card, or the OS.

Of further note, the new data object is authenticated by the existing application before the download manager is called to perform the install event. Thus, while the OS may provide the resource necessary to install a new application, the existing application maintains the security mechanisms by which creation of the new application is allowed. This is an important feature in a system which allows multiple applications from multiple vendors to be run on the same smart card using a common operating system. Each issuer thus retains complete security control over the downloading of upgrade and replacement applications. The security mechanism need not be left to the OS and/or shared with the smart card manufacturer.

Further, this ability to authenticate new programming code "on card" allows a smart card according to the present invention to be updated, or to have a new application added in the field through a non-secure transmission medium like the Internet. As explained above, conventional smart cards can only facilitate upgrades, if at all, on trusted machines.

Thus, assuming for the moment that a conventional smart card has the ability to uprade an existing application in the field, such upgrading could only be done via a trusted machine since the smart card itself could not perform the authentication routine required to verify the new code. This is true for any new code downloaded to the conventional smart card.

In the exemplary method described above, the new data object need not be immediately installed. Rather, it may be left inertly residing in read/write memory until needed, if ever. Thus, a rarely used but marketable option to an application might be stored in read/write memory as a data object, without the overhead of a fully installed application segment, until required, if ever, by a user. Once needed, it may be installed and run as part of the application.

Figure 7:
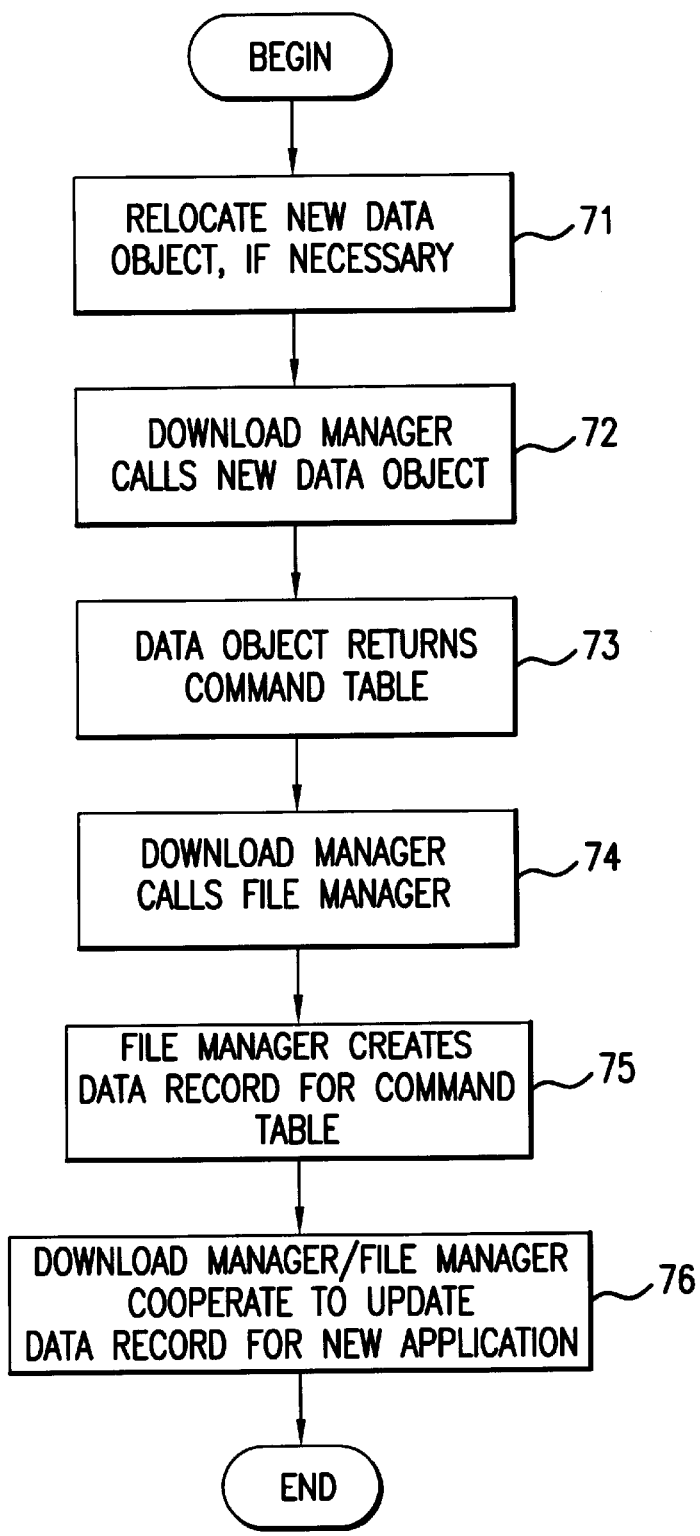
FIG. 7 is a flowchart illustrating and exemplary routine to accomplish an install event, within the download routine of FIG. 6.

The install event described above is further described in relation to the flowchart shown in FIG. 7. The install event is controlled by the download manager, which is preferably part of the OS. When called by an application, or within the OS, to create a new application the download manager is always called in relation to a new data object, i.e., a data object stored in memory but not yet formed into a new application. At times, depending on the nature of hardware resources and the contents of memory, the download manager may be forced to relocate the new data object in read/write memory (71) prior to making the new application. Once properly situated in memory, the new data object is called by the download manager (72). In the context of the download manager, the new data object is really a new application data object as compared with other types of data objects stored in memory. Once called by the download manager, the new application data object will return a command table (73). Following return of the command table, the download manager will call the file manager (74) which will define within the file directory a data record associated with the command table (75). Having previously established a data record in the file directory for the new application data object, this data record must be updated by cooperation of the download manager and the file manager to reflect the conversion of the new application data object into a new application (76).

The command table may have various structures or be implemented in any number of different algorithms. In whatever form, the command table serves to identify every command executable by the new application. When a command is received in the OS via an I/O loop, for example, the smart card OS will seek to identify an application "owning" the command, i.e., an application able to execute the command. This is done by reference to the one or more command tables stored in memory. Like all persistent data objects and files in memory, each command table must be referenced in a file directory.

In addition to the command table, the new application may create any number of additional data objects associated with the new application. Such additional data objects may be data, variables, files, records, sub-applications or anything else required by the new application. Any additional data object intended to be persistent in memory will have an associated data record stored in the file directory.

Figure 8:
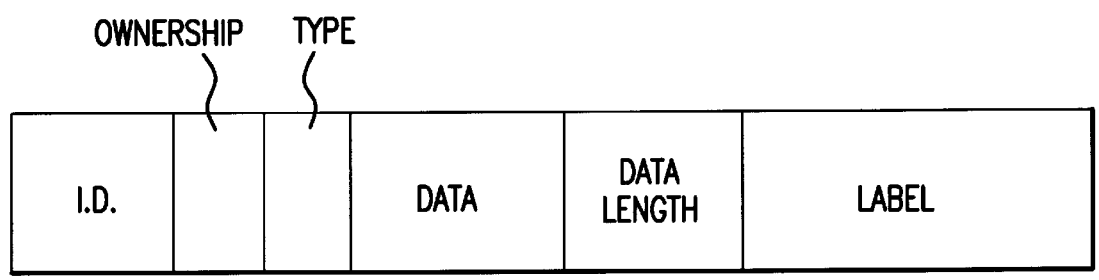
FIG. 8 illustrates an exemplary structure for a data record used within the present invention.

FIG. 8 shows an exemplary structure for a data record. In one aspect of the present invention, each data record in the file directory is stored with a known structure or format. Thus, a command table data record will have the same basic structure as all other data records in the file directory. Data records within a file directory may be distinguished, for example, by their type field. While not required as part of the present invention, use of a standard data record structure provides notable benefits. As one of ordinary skill will understand, the exact nature, size, and characteristics of this "standard" data record structure can be left to the individual programmer. The explanation which follows is merely a presently preferred example.

FIG. 8 illustrates an exemplary 16-byte data record structure comprising a 2-byte ID field, a 1-byte ownership field, a 1-byte type field, a 4-byte data field, a 2-byte data length field, and a 6-byte label field. As presently preferred the type field and the label field are user definable. That is, an application's programmer may use these data record fields for any purpose whatsoever. The download manager, file manager, memory manager, and the OS in general, do not demand that these fields be defined. They are merely variable data fields associated with a data record. As examples, the type field might indicate that the associated data object is an application, a command table, a file, or some other type data object. The label field might indicate the access type for the data record.

The ID field identifies the data record within the file system administered by the OS. The ownership field includes ownership information. In the present example, the ownership field of the data record contains the unique ownership byte previously described. Only the OS may access and define the ID and ownership fields in each data record.

The data field and the data length field are related within each data record. The data length field specifies the size of the data field. In the preferred embodiment, the data field is allocated 4 bytes, it's maximum data size. Thus, if the data length field indicates that the data is 4 bytes or less in size, then the data field stores the actual data associated with the data record. If, however, the data length field indicates that the data field is greater than 4 bytes in size, the data field stores a 4-byte data pointer indicating the beginning address, elsewhere in read/write memory at which the actual data may be found.

Figure 9:
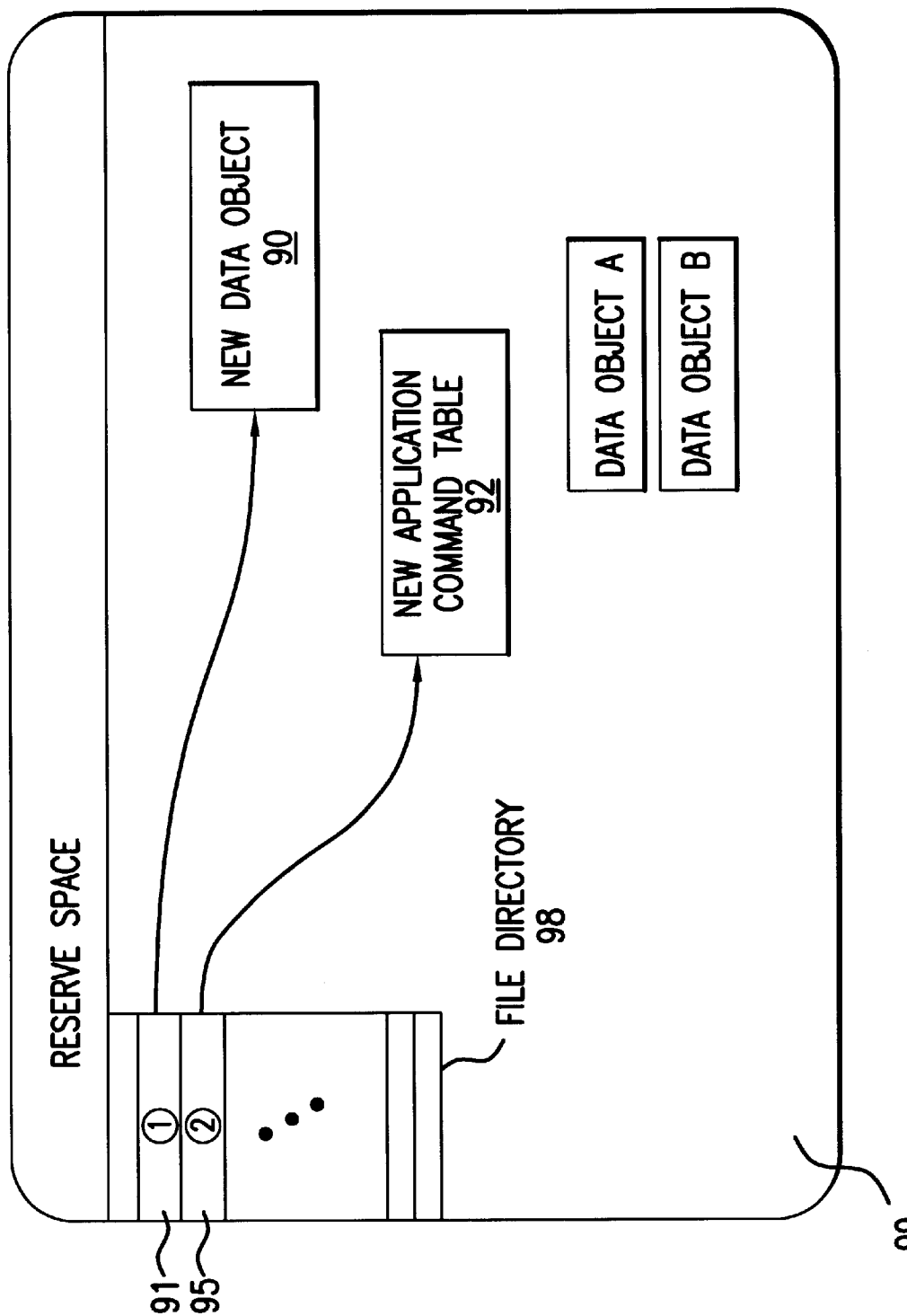
FIG. 9 conceptually illustrates a portion of read/write memory to further describe an install event.

An example of an install event will now be described with reference to FIG. 9. A new application data object 90 has already been stored in read/write memory 99. When called by the download manager, the new application data object returns at least a command table 92 which is stored in read/write memory. By operation of the file manager, a command table data record 95 is created in the file directory 98. Other data objects, A and B, may also be created in read/write memory as part of the install event. If such optional data objects are intended to be persistent with read/write memory, each must define a corresponding data record in the file directory. After successfully creating the new application with all of its associated data objects and data records, the download manager and the file manager must change the nature of the original data record 91 associated with the new application data object.

For example, when stored in read/write memory, the new application data object data record indicated ownership by the "existing application." In other words, the existing application (the boot application in the minimal smart card example) which inserted the new application data object into read/write memory and called the download manager "owned" the new application data object at that time. Once converted into a new application the ownership field for the new application data record indicates ownership by the OS. That is, henceforth, the OS "own" the new application and deal with it as with all other previously installed applications. Similarly, the type field which once indicated a "data" type for the new application data object, is changed to an "application" type once the new application has been installed. With its data record properly defined in the file directory and having a defined command table, the new application is ready to receive commands from the OS I/O loop, for example.

By their very size smart cards include a limited set of resources. Memory space is perhaps the most critical smart card resource. Thus, any attempt to expand the capabilities of conventional smart cards to run multiple applications on a true operating system must address the issue of useful memory space conservation. The commonly assigned and previously incorporated U.S. patent application Ser. No. 09/386,286 discloses a system and method for reallocating read/write memory space. To facilitate the return and reuse of memory space, one aspect of the present invention provides a method of de-installing an application.

Figure 10:
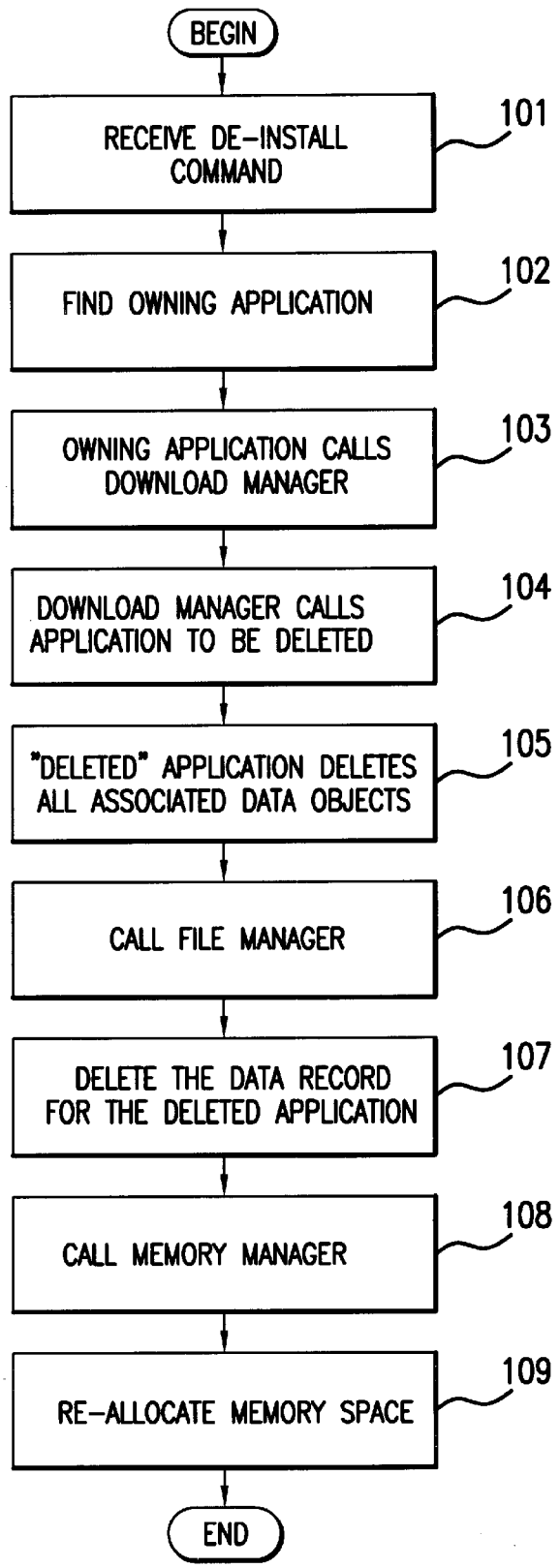
FIG. 10 is a flowchart illustrating an exemplary routine by which a new application is de-installed.

A presently preferred method for de-installing an application on a smart card will be explained with reference to the flowchart shown in FIG. 10. The illustrated de-install event begins when the smart card receives a de-install application command in the OS from a terminal (101). The OS locates the application "owning" this command (102). Alternatively, a de-install event may arise from operation of an application on the smart card. That is, during operation, a first application may require de-installation of a second application or even de-installation of itself.

However initiated, the application executing the de-install event calls the download manager (103). The download manager calls the application to be de-installed (104). The application executing the de-install event may de-install itself or de-install some other application. Naturally, the ability of a first application to delete a second application requires the first (executing) application to "own" the second (de-installed) application. Such ownership is readily indicated by the ownership field of associated data record for the second application, for example.

The application to be deleted first deletes all associated data objects (105). The process of deleting data objects typically includes removing the data record associated each data object from the file directory. Again, all associated data objects may be readily recognized in memory by scanning through the file directory searching for data records having particular ownership field information. Once all associated data objects have been deleted, the file manager is called (106). The file manager will then delete the file directory entry for the data record associated with the de-installed application (107). Once the application has thus been de-installed, the memory manager is called (108), and memory space once allocated to the now de-installed application is reallocated as being "available" (109).

The long term commercial success of smart cards requires an ability to upgrade capabilities while the smart card remains in the user's possession. That is, smart cards must be able to receive new applications and upgrade existing applications in the field, preferably through non-secure media such as the Internet. Any number of conventional authentication routines may be used within the context of the present invention to verify data objects and commands. The OS of the present invention facilitates any reasonable security routine which may be implemented by a specific application. No one "OS-based" security model need be mandated.

The present invention provides a system and method for securely downloading new applications and existing application upgrades. A true smart card operating system is the only efficient way to accomplish secure implementation and operation of multiple applications from different vendors on a single card. Further, as smart cards begin to accept multiple applications from different vendors, the card's ability to install and de-install applications must operate without impacting the smart card operating system or other existing applications. Since there are relatively few smart card manufacturers which provide cards for all issuers, each smart card issuer will require a system which allows them complete control over the programming of the card.

The present invention has been described using several examples. The context needed to explain the download manager, initialization routine and install/de-install events includes some assumptions regarding data record use and storage, data record structure, data object organization in memory, and the type of memory commonly used. These contextual aspects are used to effectively explain the broader inventive concepts of the present invention. However, the present invention is not limited to the disclosed examples and teaching context. Rather the present invention is defined by the attached claims.

What is claimed:

1. A method of initializing a smart card, the smart card comprising a microprocessor and a memory, the memory comprising ROM and read/write memory, the ROM storing an operating system (OS) and an application, the method comprising:

powering the smart card via a terminal;

determining whether the smart card has ever previously been powered;

upon determining that the smart card has never previously been powered, performing an first-power initialization routine.

2. The method of claim 1, wherein the first-power initialization routine comprises:

initializing the read/write memory;

locating the application in ROM; and installing the application in read/write memory.

3. The method of claim 2, wherein the application comprises a boot application allowing insertion of a new data object into read/write memory, and a call to a download manager in the OS.

4. The method of claim 3, further comprising:

following installation of the application in read/write memory, performing an initialization routine, comprising:

building a memory management record; and sending an Answer-To-Reset (ATR) signal to the terminal.

5. The method of claim 4, further comprising:

before performing the first-power initialization routine, sending a first portion of the ATR signal to the terminal; and wherein the step of sending the ATR signal to the terminal following the step of building the memory management record comprises sending a second portion of the ATR signal to the terminal.

6. The method of claim 1, wherein upon determining that the smart card has previously been powered, performing an initialization routine, comprising:

building a memory management record; and sending an Answer-To-Reset (ATR) signal to the terminal.

7. The method of claim 6, wherein the initialization routine further comprises:

determining whether a transaction record is present in memory; and upon determining that a transaction record is present in memory calling a transaction manager, and by operation of the transaction manager, clearing the transaction record.

8. The method of claim 6, wherein the initialization routine further comprises, after sending the ATR, entering an Input/Output routine.

9. The method of claim 6, further comprising:

before performing the initialization routine, sending a first portion of the ATR signal to the terminal; and wherein the step of sending the ATR signal to the terminal following the step of building the memory management record comprises sending a second portion of the ATR signal to the terminal.

10. The method of claim 2, wherein installing the application in read/write memory comprises:

calling the application from the terminal;

receiving in the application a command to create a command table in read/write memory.

11. The method of claim 10, further comprising:

following creation of the command table in read/write memory, creating additional data objects in read/write memory.

12. The method of claim 3, wherein installing the application in read/write memory comprises:

calling the boot application from the terminal;

receiving in the boot application a first command, and in response thereto generating at least one data record and storing the at least one data record in read/write memory.

13. The method of claim 12, wherein the at least one data record is a command table for the boot application.

14. The method of claim 13, wherein following storage of the boot application command table, and in responsive to a second command from the terminal, downloading a new application from the terminal.

15. The method of claim 14, wherein the step of downloading the new application comprises:

inserting a new application data object in read/write memory, and converting the new application data object into a new application.

16. The method of claim 15, wherein the step of converting the new application data object into a new application comprises:

calling a download manager;

from the download manager, calling the new application data object;

by operation of the of the new application data object, creating a command table for the new application; and storing the command table in read/write memory.

17. The method of claim 16, further comprising:

before calling the download manager, performing in the boot application a security verification routine on the new application data object.

18. A method of downloading a second application from a terminal into a smart card memory, the memory storing an operating system (OS) and a first application, the method comprising:

calling the first application from the terminal;

by operation of the first application, inserting a new application data object in memory; and converting the new application data object into the second application.

19. The method of claim 18, further comprising:

before converting the new application data object into the second application, verifying the authenticity of the new application data object within the first application.

20. The method of claim 19, wherein verifying the authenticity of the new application data object comprises:

verifying a digital signature associated with the new application data object.

21. The method of claim 18, wherein the step of converting the new application data object into the second application comprises:

calling a download manager in the OS;

calling the second application from the download manager, and generating a command table for the second application.

22. The method of claim 21, further comprising:

following generation of the command table, calling a file manager in the OS; and by operation of the file manager, generating a first data record associated with the command table and storing the first data record in memory.

23. The method of claim 22, wherein the step of inserting the new application data object comprises:

calling the file manager in the OS;

by operation of the file manager generating a second data record associated with the new application data object and storing the second data record in memory.

24. The method of claim 23, wherein the first and second data records each comprise an ownership field and a type field.

25. The method of claim 24, wherein the step of generating the second data record associated with the new application data object comprises:

defining the ownership field in the second data record to indicate first application ownership; and defining the type field in the second data record to indicate a data object type.

26. The method of claim 25, wherein the step of generating the first data record associated with the new application comprises:

defining the ownership field in the first data record to indicate OS ownership; and defining the type field in the first data record to indicate an application type.

27. The method of claim 23, wherein the command table comprises an index of all commands executable by the second application.

28. A method of de-installing an application on a smart card, the smart card comprising a microprocessor and a memory, the memory storing an operating system (OS) and the application, the method comprising:

receiving a de-install command;

locating the application owning the de-install command, and by operation of the owning application calling a download manager located in the operating system;

by operation of the download manager, deleting all data objects associated with the application; and deleting all data record associated with the application.

29. The method of claim 27, wherein the step of deleting all data objects associated with the application, and deleting all data record associated with the application comprises:

beginning with a I st data object associated with the application and continuing through the Nth data object associated with the application, for each data object;

deleting the data object by operation of the application; and calling the file manager, and by operation of the file manager, deleting the data record associated with the data object.

30. The method of claim 29, wherein an application data record associated with the application is stored in memory, the method further comprising:

following deletion of the Nth data object and the Nth data record associated with the application, deleting the application data record from memory.

31. The method of claim 30, further comprising:

following deletion of the application data record from memory, calling a memory manager and by operation of the memory manager reallocating memory space associated with the application as being available.

* * * * *